US008038219B2

United States Patent
Boes et al.

(10) Patent No.: US 8,038,219 B2
(45) Date of Patent: Oct. 18, 2011

(54) ADJUSTABLE HEAD RESTRAINT FOR VEHICLE SEAT

(75) Inventors: Klaus Boes, Allershausen (DE); Juergen Geisslinger, Ellingen (DE); Tobias Bokelmann, Gröbenzell (DE)

(73) Assignee: Lear Corporation, Southfield, MI (US)

( * ) Notice: Subject to any disclaimer, the term of this patent is extended or adjusted under 35 U.S.C. 154(b) by 359 days.

(21) Appl. No.: 12/194,351

(22) Filed: Aug. 19, 2008

(65) Prior Publication Data
US 2009/0058162 A1    Mar. 5, 2009

Related U.S. Application Data

(60) Provisional application No. 60/969,823, filed on Sep. 4, 2007.

(30) Foreign Application Priority Data

Oct. 8, 2007    (DE) .......................... 10 2007 048 151

(51) Int. Cl.
*B60N 2/48* (2006.01)
(52) U.S. Cl. ....................................... 297/410; 297/406
(58) Field of Classification Search .................. 297/391, 297/406, 408, 409, 410
See application file for complete search history.

(56) References Cited

U.S. PATENT DOCUMENTS

| 4,265,482 A | | 5/1981 | Nishimura et al. | |
|---|---|---|---|---|
| 4,304,439 A | * | 12/1981 | Terada et al. | 297/409 |
| 4,540,217 A | * | 9/1985 | Suzuki | 297/391 |
| 4,568,123 A | * | 2/1986 | Yasui et al. | 297/410 |
| 4,657,304 A | * | 4/1987 | Heesch et al. | 297/391 |
| 4,674,797 A | | 6/1987 | Tateyama | |
| 4,685,737 A | * | 8/1987 | Deley et al. | 297/408 |
| 4,762,367 A | * | 8/1988 | Denton | 297/409 |
| 5,020,855 A | * | 6/1991 | Lindberg et al. | 297/391 |
| 6,082,817 A | | 7/2000 | Muller | |
| 6,390,558 B2 | | 5/2002 | Fischer et al. | |
| 6,688,697 B2 | | 2/2004 | Baumann et al. | |

(Continued)

FOREIGN PATENT DOCUMENTS

DE    10035972 A1    2/2001

(Continued)

OTHER PUBLICATIONS

German Patent Office, Office Action for German Patent Application No. 10 2008 060 641.3, mailed Dec. 31, 2009, 3 pages.

(Continued)

*Primary Examiner* — Peter R. Brown
(74) *Attorney, Agent, or Firm* — Brooks, Kushman P.C.

(57) ABSTRACT

A vehicle seat is disclosed that provides longitudinal adjustment and height adjustment of a head restraint by actuation of a manual release. One embodiment discloses a vehicle seat with a rod extending from a seat back and a frame mounted to the rod. A head restraint is mounted to the frame by a linkage to extend and retract. A locking mechanism cooperates with the head restraint and the frame for permitting incremental locking positions of the head restraint relative to the frame. A manual release releases the locking mechanism to extend and retract the head restraint relative to the rod. Another embodiment includes an eccentric mechanism pivotally connected to the frame. A wire spring is mounted to the frame for engaging a notch in the rod. An actuator rotates an eccentric mechanism for disengaging the wire spring from the notch in the rod for permitting height adjustment.

19 Claims, 9 Drawing Sheets

U.S. PATENT DOCUMENTS

| | | | |
|---|---|---|---|
| 6,715,829 B2 | 4/2004 | Svantesson et al. |
| 6,767,064 B2 | 7/2004 | Veine et al. |
| 6,805,411 B2 | 10/2004 | Gramss et al. |
| 6,899,395 B2 | 5/2005 | Yetukuri et al. |
| 6,983,995 B1 | 1/2006 | Veine et al. |
| 7,048,336 B2 | 5/2006 | Mawbey et al. |
| 7,070,235 B2 | 7/2006 | Schilling et al. |
| 7,073,863 B1 | 7/2006 | Low et al. |
| 7,111,901 B2 | 9/2006 | Schlierf et al. |
| 7,137,668 B2 | 11/2006 | Kreitler |
| 7,144,083 B2 | 12/2006 | List et al. |
| 7,195,313 B2 | 3/2007 | Hippel et al. |
| 7,210,734 B1 * | 5/2007 | Yetukuri et al. | 297/61 |
| 7,232,187 B1 | 6/2007 | Sundararajan et al. |
| 7,306,287 B2 * | 12/2007 | Linardi et al. | 297/410 |
| 7,871,129 B2 | 1/2011 | Boes et al. |
| 7,878,597 B2 | 2/2011 | Bokelmann et al. |
| 2001/0028191 A1 | 10/2001 | Lance |
| 2001/0040396 A1 | 11/2001 | Kreuels et al. |
| 2004/0195894 A1 | 10/2004 | Pal et al. |
| 2005/0077762 A1 | 4/2005 | Kraemer et al. |
| 2006/0226688 A1 | 10/2006 | Terada et al. |
| 2007/0216211 A1 | 9/2007 | Mori |
| 2007/0246989 A1 * | 10/2007 | Brockman | 297/391 |
| 2008/0001456 A1 | 1/2008 | Muller et al. |

FOREIGN PATENT DOCUMENTS

| | | |
|---|---|---|
| DE | 102004005695 A1 | 8/2004 |
| DE | 102004055986 A1 | 6/2006 |
| DE | 102005020276 B3 | 9/2006 |
| DE | 102006015785 A1 | 10/2006 |
| EP | 1717099 A2 | 11/2006 |
| FR | 2852066 A1 | 9/2004 |
| GB | 2340744 A | 3/2000 |
| WO | 2004089688 A1 | 10/2004 |
| WO | 2007073034 A1 | 6/2007 |

OTHER PUBLICATIONS

Notice of Allowance for copending U.S. Appl. No. 12/260,642, mailed Apr. 5, 2010, 7 pages.

German Office Action for corresponding Application No. DE 10 2007 048 151, mailed Apr. 10, 2008, 3 pages.

U.S. Appl. No. 12/194,375, Height Adjustable Head Restraint for a Vehicle Seat, filed Aug. 19, 2008, 16 pages.

U.S. Appl. No. 12/325,386, Seat Assembly Having an Adjustable Head Restraint Assembly, filed Dec. 1, 2008 by Klaus Boes et al., 21 pages.

* cited by examiner

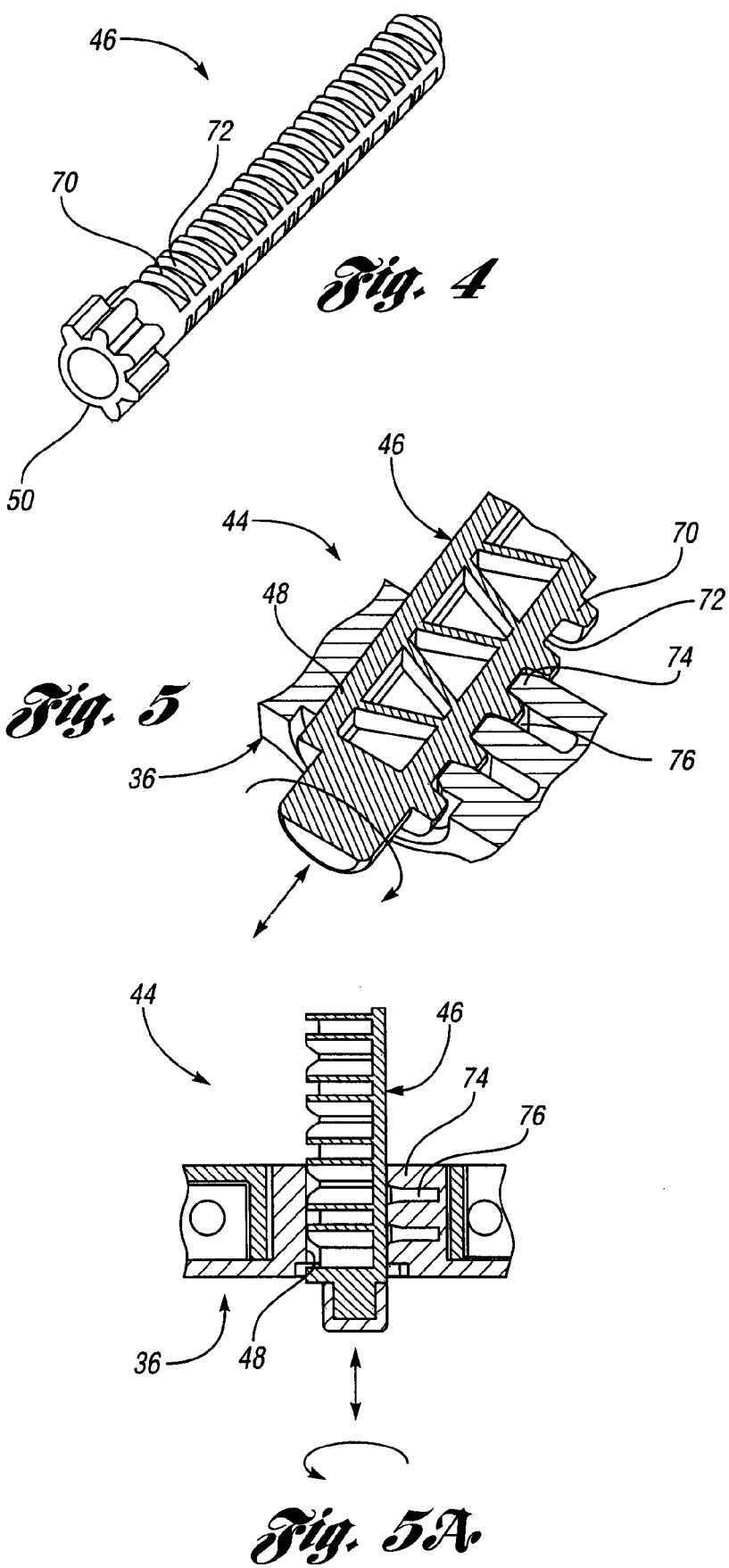

ADJUSTABLE HEAD RESTRAINT FOR VEHICLE SEAT

CROSS-REFERENCE TO RELATED APPLICATIONS

This application claims the benefit of U.S. provisional application Ser. No. 60/969,823, filed on Sep. 4, 2007 and claims priority to German Application No. 10 2007 048 151.0, filed on Oct. 8, 2007, the disclosures of which are hereby incorporated by reference in their entirety.

BACKGROUND OF THE INVENTION

1. Field of the Invention

The invention relates to adjustable head restraints for vehicle seats.

2. Background Art

The prior art has provided adjustable head restraints for vehicle seats. One such example is U.S. Pat. No. 6,899,395 B2, which issued on May 31, 2005 to Yetukuri et al. Adjustable head restraints permit the user to adjust the head restraint to a desired position.

The prior art has also provided active head restraint systems that translate a head restraint towards an occupant in response to an impact condition to minimize whiplash conditions during an impact. Some active head restraint systems employ expandable head restraints. An example of an active head restraint system is disclosed in U.S. Pat. No. 6,767,064 B2, which issued on Jul. 27, 2004 to Veine et al.

SUMMARY OF THE INVENTION

One embodiment of the present invention discloses a vehicle seat having a seat back for supporting a back of an occupant. A rod is mounted to and extending from the seat back. A frame is mounted to the rod to slide along the rod. A linkage is mounted to the rod to extend and retract relative to the frame in a forward and rearward direction. A head restraint is mounted to the linkage for supporting a head of an occupant and for extending and retracting relative to the frame. A locking mechanism cooperates with the head restraint and cooperates with the locking mechanism for releasing the locking mechanism and to retract the head restraint relative to the rod.

Another embodiment of the invention discloses a vehicle seat having a seat back for supporting the back of an occupant. A rod is mounted to and extends from the seat back and the rod has a series of notches. A frame is mounted to the rod to slide along the rod. The head restraint is mounted to the frame for supporting a head of an occupant. An eccentric mechanism is pivotally connected to the frame. A wire spring is mounted to the frame for engaging one of the notches of the rod and the wire spring cooperates with the eccentric mechanism such that rotation of the eccentric mechanism to a released position retracts the wire spring from the notch. An actuator for rotating the eccentric mechanism from a locked position to the release position is provided to slide the head restraint and frame along the rod.

Yet another embodiment of the present invention discloses a vehicle seat having a seat back for supporting a back of an occupant. A rod is mounted to and extends from the seat back and the rod has a series of notches. A frame is mounted to the rod to slide along the rod. A head restraint is mounted to the rod for supporting a head of an occupant and for extending and retracting relative to the frame in a fore and aft direction. A first locking mechanism cooperates with the head restraint and the frame for permitting incremental locking positions of the head restraint relative to the frame. A second locking mechanism cooperates with the notches for maintaining a height position of the head restraint relative to the rod. A manual release is provided cooperating with the first and second locking mechanisms for releasing the first locking mechanism to extend and retract the head restraint relative to the rod and for releasing the second locking mechanism for permitting height adjustment of the head restraint.

The above embodiments and other embodiments, features, benefits and advantages of the present invention are readily apparent from the following detailed description of embodiments of the invention and the accompanying drawings.

BRIEF DESCRIPTION OF THE DRAWINGS

FIG. 4 is an enlarged perspective view of a locking shaft of the head restraint of FIG. 1;

FIG. 5 is an enlarged perspective partial section view of the locking shaft of FIG. 4 in cooperation with a frame of the head restraint of FIG. 1, illustrated in a locked position;

FIG. 5a is an enlarged partial section view of the locking shaft of FIG. 4 in cooperation with a frame of the head restraint of FIG. 1, illustrated in a released position;

DETAILED DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
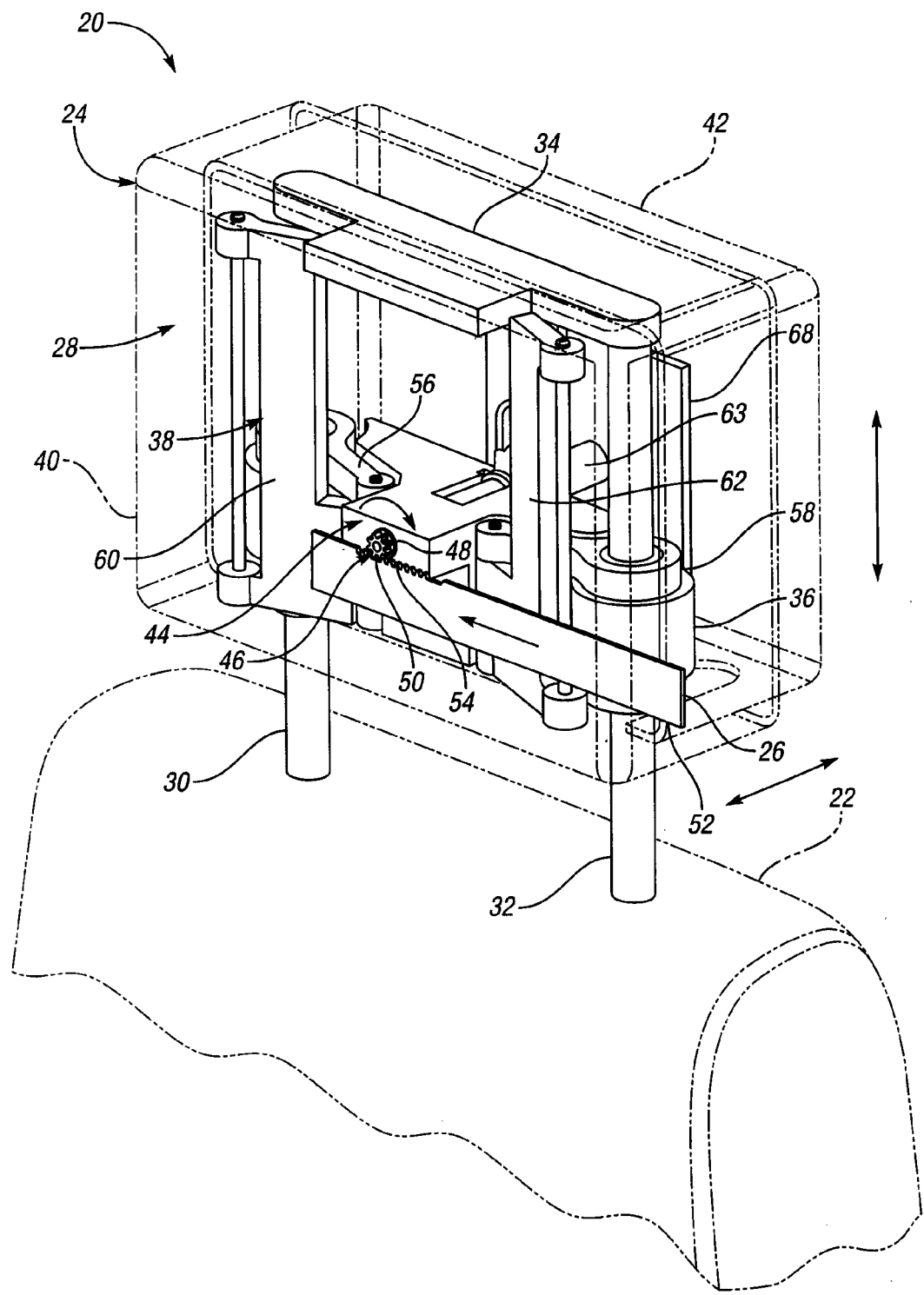
FIG. 1 is a front perspective view of a top region of a vehicle seat in accordance with the present invention, illustrating an adjustable head restraint in a first position.

With reference now to FIG. 1, a vehicle seat is illustrated in accordance with the present invention and is referenced generally by numeral 20. The vehicle seat 20 includes a seat cushion (not shown) that is adapted to be installed within an interior of a vehicle, such as an automobile, aircraft, water craft or the like for seating an occupant. A seat back 22 is also installed in the vehicle for supporting a back of the occupant. The seat back 22 may be mounted directly to the vehicle or connected to the seat cushion. Although an individual seat 20 is depicted in FIG. 1, the invention contemplates any seat configuration, such as a bench seat, a split frame seat, a front row seat, a rear row seat, or the like.

The seat cushion and the seat back 22 are both fabricated from suitable and known materials and manufacturing methods. For example, the seat back 22 utilizes a structural frame, foam for cushioning and a cover.

The seat 20 also includes a head restraint 24 that is mounted to the frame of the seat back 22 and extends above the seat back 22 for supporting a head of the occupant. The head restraint 24 has a release button 26 mounted on a lateral side of the head restraint 24 for permitting an occupant to depress the button 26 and adjust a height of the head restraint 24 relative to the seat back 22 as illustrated by an upright arrow in FIG. 1, and concurrently adjust a position of the head restraint 24 in a fore and aft direction as illustrated by the longitudinal arrow in FIG. 1. Thus, the user can adjust the height and longitudinal position of the head restraint 24 by actuating one release button. Moreover, the occupant can depress the release button 26 and position the height and longitudinal position of the head restraint 24 with one hand.

The head restraint 24 is illustrated with a cover and foam padding removed to reveal a head restraint position adjustment mechanism 28. The position adjustment mechanism 28 includes a pair of rods 30, 32 that are mounted to a frame of a seat back 22 and extend above the seat back 22 for supporting the head restraint 24. The rods 30, 32 are connected at their distal ends by an upper transverse bar 34. Likewise, a lower transverse frame 36 is mounted to the rods 30, 32 to translate along the rods 30, 32 to perform the height adjustment of the head restraint 24. Additionally, the frame 36 supports the padding and cover of the head restraint 24 to translate along the rods 30, 32 with the height adjustment of the frame 36.

A linkage 38 is mounted to the frame 36 for extending and retracting relative to the frame 36 in the longitudinal direction. The head restraint 24, in one embodiment, is an expandable head restraint 24. For example, the head restraint 24 includes a forward shell 40 that is mounted to the linkage 38 for providing a head support surface of the head restraint 24 and for extending and retracting relative to the frame 36. The head restraint 24 also includes a rear shell 42 that cooperates within the forward shell 40 for enclosing the position adjustment mechanism 28 and for permitting a longitudinal dimension of the head restraint 24 to vary due to the translation of the forward shell 40 relative to the rear shell 42.

The position adjustment mechanism 28 includes a locking device 44 for locking the location of the forward shell 40 relative to the frame 36. The locking device 44 includes a locking shaft 46 that is pivotally connected to the forward shell 40. The locking shaft 46 extends centrally between the rods 30, 32 and is generally perpendicular to the regions of the rods 30, 32 upon which the frame 36 translates for height adjustment of head restraint 24. The locking shaft 46 extends through a bore 48 in the frame 36 and cooperates within the bore 48 for locking a longitudinal position of the locking shaft 46 relative to the frame 36.

The locking shaft 46 is illustrated in a locked position in FIG. 1. The locking shaft 46 includes a pinion gear 50 formed upon its forward end adjacent to an inner surface of the forward shell 40. The release button 26 is mounted on a lateral end of an actuation bar 52 that is mounted to the forward shell 40 to slide relative to the forward shell 40. The actuation bar 52 includes a gear rack 54 formed on an inboard side in engagement with the pinion gear 50 of the locking shaft 46. Thus, when the release button 26 is actuated inward, the actuation bar 52 is translated toward the rod 30, thereby rotating the locking shaft 46 clockwise in FIG. 1 to a released position whereby longitudinal position adjustment of the forward shell 40 is permitted.

The linkage 38 includes a pair of primary links 56 pivotally connected to the frame 36, generally coaxial with the rod 30. The linkage 38 also includes another pair of primary links 58 pivotally connected to the frame 36 generally coaxial with the rod 32. The linkage 38 further includes a secondary link 60 that is pivotally connected to the pair of primary links 56 and pivotally connected to the forward shell 40 at an inner surface of the shell 40. Likewise, the linkage 38 includes another link 62 pivotally connected to the pair of primary links 58 and pivotally connected to the forward shell 40 at an inner surface of the shell 40. Thus, the links 56, 58, 60, 62 of the linkage 38 provide stability and a controlled path of linear motion for translation of the shell 40 in the longitudinal direction.

Figure 2:
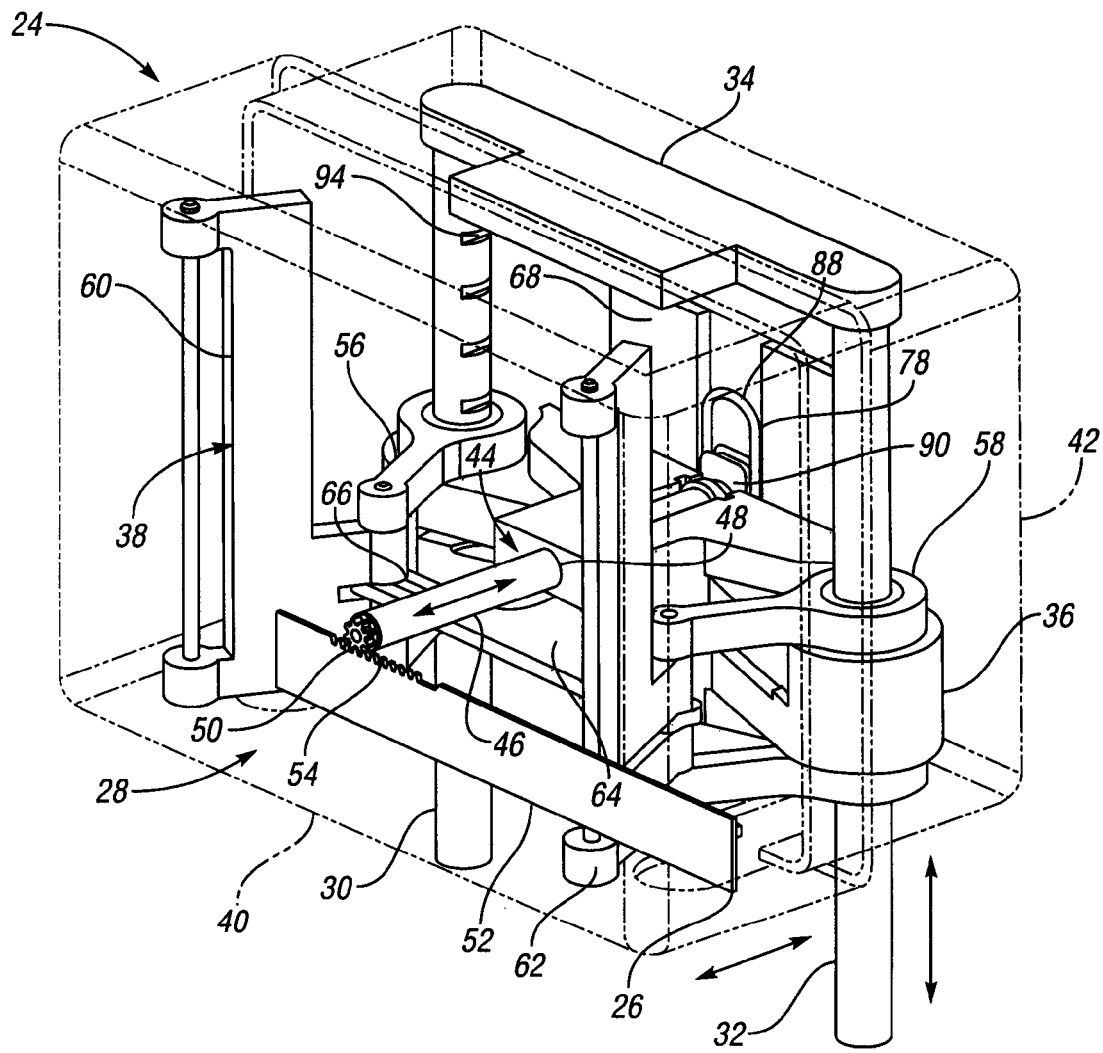
FIG. 2 is a front perspective view of the head restraint of FIG. 1, illustrated in a second position.

When the locking device 44 is released, the user can translate the forward shell 40 to an extended position as illustrated in FIG. 2. Thus, as the shell 40 is extended, the linkage 38 extends and the shaft 46 extends forward relative to the frame 36.

Figure 3:
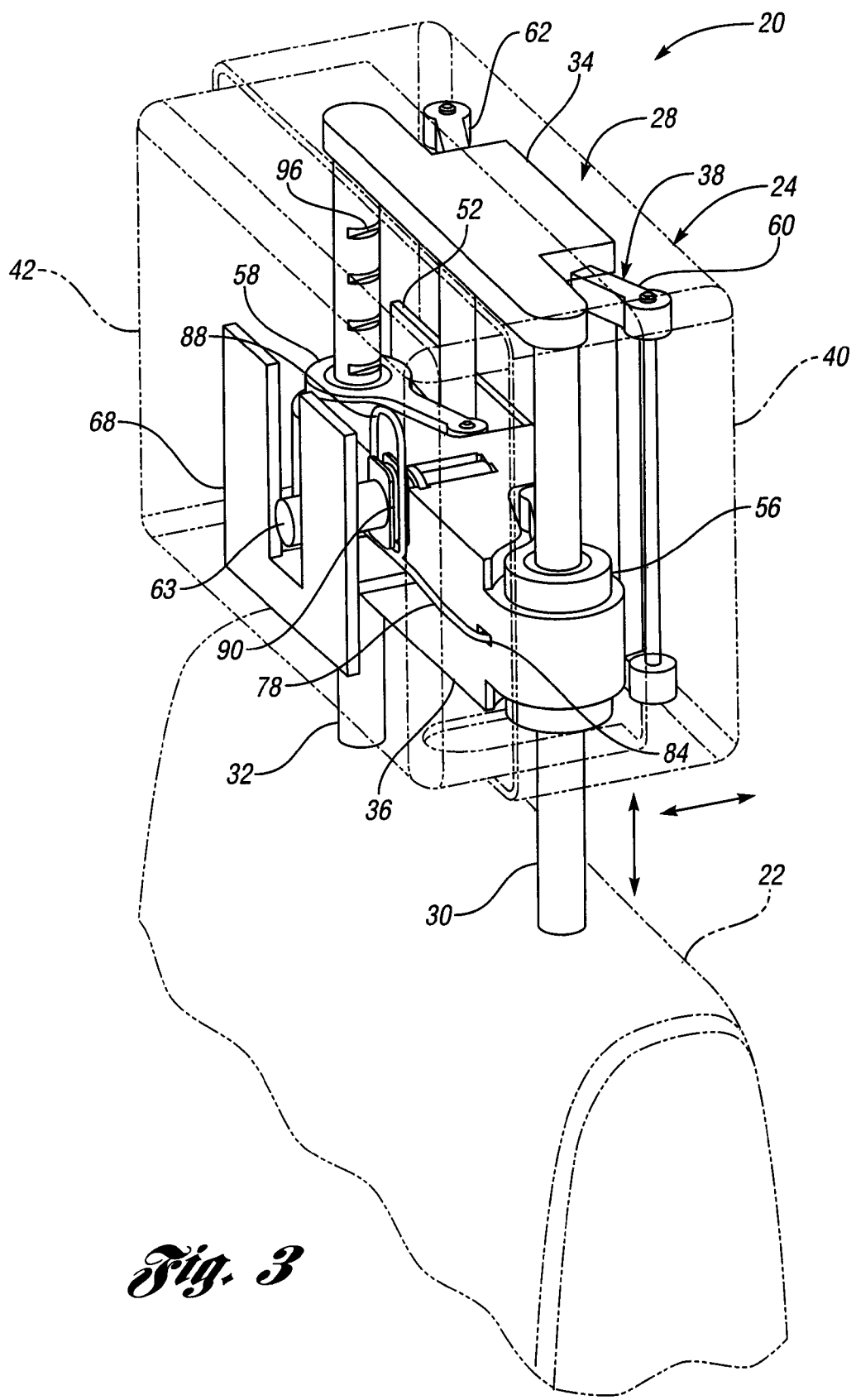
FIG. 3 is a rear perspective view of the vehicle seat of FIG. 1, illustrating the head restraint in the first position.

Referring now to FIG. 3, a rearward dimension of the rear shell 42 is sized to house a rearward position of the shaft 46 relative to the frame 36. The shaft 46 is guided within a tube 63. The tube 63 is pivotally connected to the rear shell 42 and cooperates with the frame 36 to rotate and translate relative to the frame 36.

Referring again to FIG. 2, a yoke 64 is mounted to the frame 36 for translation relative to the frame 36 in the longitudinal direction. The yoke 64 includes a pair of slots 66 each cooperating with the pivotal connection of one of the pairs of primary links 56, 58 and the associated secondary link 60, 62. Thus, as the linkage 38 extends and retracts, the yoke 64 extends and retracts relative to the frame 36. Referring again to FIG. 3, the yoke 64 extends through the frame 36 and includes a bracket 68 mounted to an inner surface of the rear shell 42. Thus, as the head restraint 24 expands, the linkage extends the forward shell 40 away from the rods 30, 32, the yoke 64 pulls the rear shell 42 forward towards the rods 30, 32 to maintain compactness of the head restraint 24. Thus, the head restraint 24 does not expand the entire dimension of translation of the forward shell 40. Rather, as the forward shell 40 translates to a fully extended position, the rear shell 42 translates a distance less than the translation of the forward shell 40 to retract to the frame 36.

Referring now to FIG. 4, the locking shaft 46 has a series of projections 70 extending radially therefrom in a limited rotational range. The projections 70 are spaced incrementally by a series of longitudinally spaced transverse recesses 72 thereby providing teeth and notches.

Referring now to FIG. 5, the locking shaft 46 and frame 36 are illustrated in the locked position. The bore 48 of the frame 36 includes a corresponding series of projections 74 sized to be received within the recesses 72 of the locking shaft 46. The projections 74 are spaced incrementally by a series of recesses 76 for receiving the projections 70 of the locking shaft 46. The projections 74 and recesses 76 are provided on one lateral region of the bore 46 as illustrated in FIG. 5. Thus, when the locking shaft 46 is in the locked position of FIGS. 1, 2 and 5, the projections 70 and recesses 72 of the locking shaft 46 are engaged with the corresponding projections 74 and recesses 76 of the frame 36.

Referring again to FIG. 1, actuation of the release button 26 translates the actuation bar 52 towards the rod 30 thereby rotating the locking shaft 46 clockwise. This clockwise rotation is illustrated in FIG. 5 and disengages the locking shaft 46, projections 70 and recesses 72 from the frame 36, projections 74 and recesses 76 as illustrated in FIG. 5a. Once the locking shaft 46 is unlocked from the frame 36, the shaft may be translated relative to the frame 36 to extend the shaft 46 and the forward shell 40 from the frame 36 as illustrated in the expanded position of FIG. 2. Once a desired position of the head restraint 24 is achieved in the longitudinal direction, the user releases the manual force from the release button 26, whereby the locking device 44 returns to the locked position of FIG. 5. In order to further adjust the position of the head restraint 24, for example, from the expanded position of FIG. 2 to a retracted position such as the position of FIG. 1, the user once again depresses the release button 26. The actuation bar 52 is thereby translated inboard thus rotating the locking shaft 46 clockwise thereby disengaging the locking engagement with the frame 36 for translating the head restraint 24 to another position such as the retracted position of FIG. 1.

Figure 6:
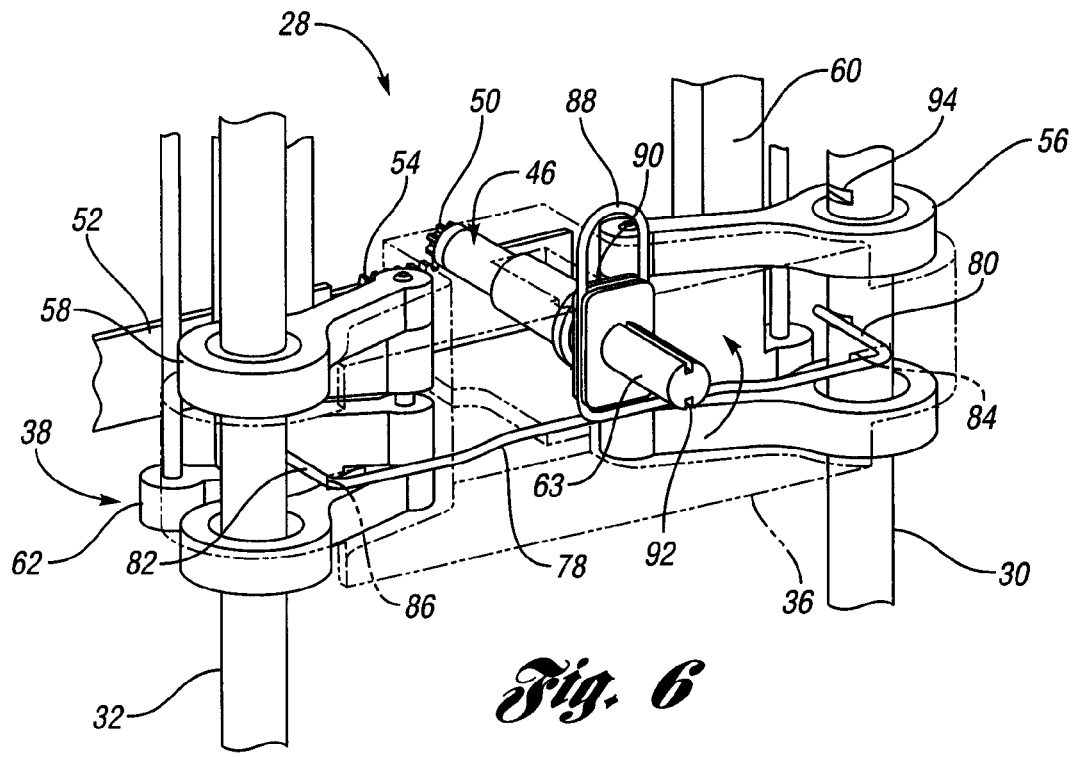
FIG. 6 is a rear perspective view of the head restraint of FIG. 1, illustrated in the locked position.

With reference now to FIG. 3, the locking device 44 is maintained in the locked position by a wire spring 78. Referring now to FIG. 6, the wire spring 78 has a pair of distal ends 80, 82 each mounted to the frame 36 by extending into a corresponding slot 84, 86 formed in the frame 36. The wire spring 78 includes a central coil 88 that extends about an eccentric drive 90. The eccentric drive 90 is pivotally connected to the frame 36 for rotating relative to the frame 36. The locking shaft 46 has a rear end extending through the tube 63 and includes a pair of keyways 92 cooperating with the tube 63 for rotating the tube 63 with the rotation of the locking shaft 46 and for permitting the locking shaft 46 to translate in the longitudinal direction relative to the tube 63. Likewise, the tube 63 is connected to the eccentric drive 90 such that rotation of the tube 63 rotates the eccentric drive 90.

Figure 7:
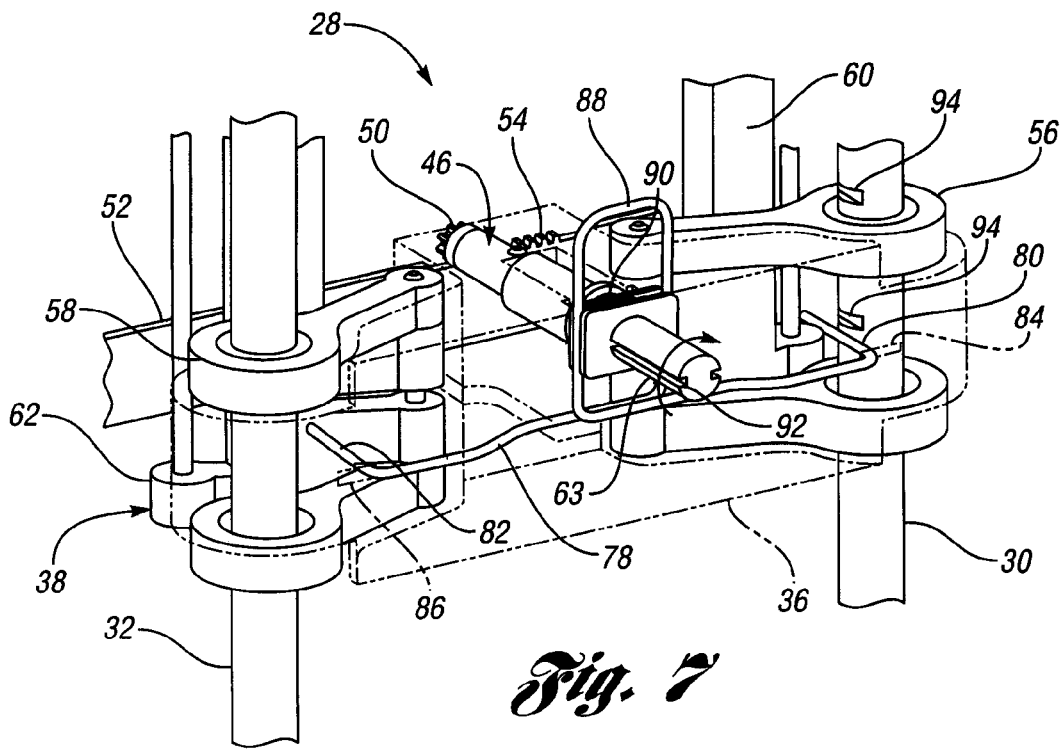
FIG. 7 is a rear perspective view of the head restraint of FIG. 1, illustrated in the released position.
Figure 8:
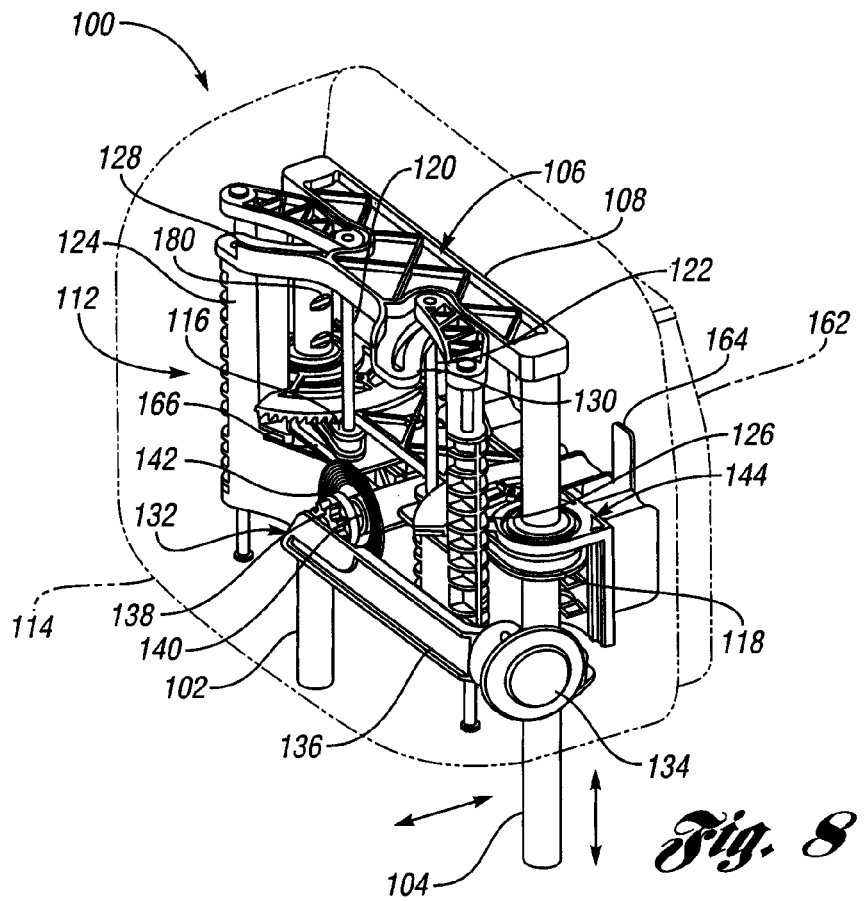
FIG. 8 is a perspective view of another adjustable head restraint in accordance with the present invention, illustrated in a first position.

The locking device 44 is illustrated in the locked position in FIG. 6. When the shaft 46 is rotated to the unlocked position, illustrated in FIG. 7, the eccentric drive 90 is rotated approximately ninety degrees thereby expanding the coil 88 of the wire spring 78. Thus, in the released position of FIG. 7, the expanded coil 88 imparts a torque upon the eccentric drive 90 urging the eccentric drive 90 to return to the locked position of FIG. 6. Thus, when a manual force is released from the release button 26, the wire spring 78 rotates the eccentric drive 90 clockwise in FIG. 7 backed to the locked position of FIG. 6 thereby locking the shaft 46 within the frame 36. This return motion provided by the wire spring 78 also causes the pinion gear 50 to drive the gear rack 54 thereby returning the release button 26 to the locked position illustrated in FIGS. 1 and 2.

The position adjustment mechanism 28 also permits height adjustment of the head restraint 24 relative to the seat back 22. As illustrated in FIGS. 2, 3, 6 and 7, the rods 30, 32 each include a series of inboard notches 94, 96 formed therein. Referring to FIG. 6, the ends 80, 82 of the wire spring 78 extend into the corresponding slots 84, 86 of the frame 36 for engaging a pair of the notches 94, 96 thereby locking the wire spring 78 and consequently the frame 36 and the head restraint 24 to a height adjustment position upon the rod 30, 32. Referring again to FIG. 7, as the shaft 46 and eccentric drive 90 are rotated to the released position, the coil 88 of the wire spring 78 expands. As the coil 88 expands, the spring ends 80, 82 are retracted within the slots 84, 86 of the frame 36 thereby disengaging the corresponding notches 94, 96 in the rods 30, 32. Therefore, in the released position of the locking device 44 illustrated in FIG. 7, the user may translate the head restraint 24 along the rods 30, 32 to a desired height adjustment position relative to the seat back 22. When the user releases the manual force upon the release button 26, the wire spring 78 rotates the eccentric drive 90 back to the locked position of FIG. 6 such that the ends 80, 82 of the wire spring 78 extend and engage the rods 30, 32. When the head restraint 24 is in the locked position of FIG. 6, the spring ends 80, 82 engage the corresponding pair of notches 94, 96 thereby locking the head restraint 24 in a locked height adjustment position.

The adjustable head restraint 24 permits the occupant to adjust a longitudinal position and height of the head restraint 24 relative to the seat back 22 by depression of one release button 26. Thus, various head supporting positions can be obtained with ease and one handed adjustment.

Typical head restraints tend to be too far away from the head of the occupant to give adequate support to the occupant, or to be comfortable while traveling. The various adjustment positions of the head restraint 24 provide comfort to the occupant and increase safety by permitting the head restraint 24 to be located closer to the head of the occupant. Additionally, such adjustment is confined within the head restraint 24 for simplifying the components and mechanisms housed within the seat back 22. Additionally, by providing the head restraint 24 in a right and near or suitable adjusted position relative to the occupant, safety conditions are achieved that are comparable to utilization of active head restraint systems that translate the head restraint towards the occupant in response to an impact condition.

Additionally, the head restraint 24 is generally compact by translating the head restraint 24 and expanding the forward shell 40 relative to the rear shell 42 such that the translation of the forward shell 40 is more than an overall expansion of the head restraint 24 thereby minimizing the volume occupied by the head restraint 24 in the fully expanded position.

Another embodiment head restraint is illustrated in FIGS. 8-14 and referenced generally by numeral 100. The head restraint 100 includes a pair of rods 102, 104 extending from an associated seat back. A head restraint position adjustment mechanism 106 is provided on the rods 102, 104 for supporting the head restraint 100 in multiple height and longitudinal positions. The rods 102, 104 are connected by an upper transverse bar 108. A frame 110 is mounted upon the rods 102, 104 to translate along the rods 102, 104 for providing the height adjustment. A linkage 112 is mounted to the frame 110 and connected to a forward shell 114 of the head restraint 100.

The linkage 112 includes a first pair of primary links 116 and a second pair of primary links 118 pivotally connected to the frame 110. Each pair of primary links 116, 118 drives a shaft 120, 122 that revolves about the corresponding rod 102, 104. The shafts 120, 122 are each pivotally connected to secondary links 124, 126. The secondary links 124, 126 are each pivotally connected to the forward shell 114. The shafts 120, 122 which provide the pivotal connection between the primary links 116, 118 and the secondary links 124, 126 each extend through an arcuate guide 128, 130, which enhances stability of the linkage 112 and promotes uniform extension of the secondary links 124, 126 for linear translation of the forward shell 114.

The position adjustment mechanism 106 includes a locking device 132 for locking the head restraint 100 in the fore and aft direction. The locking device 132 includes a release button 134 mounted on the forward shell 114. The release button 134 actuates an actuation bar 136 that is also mounted for translation in the forward shell 114. Similar to the prior embodiment, the actuation bar 136 includes a gear rack (not shown) that is engaged with a pinion gear 138 of a locking shaft 140.

Figure 9:
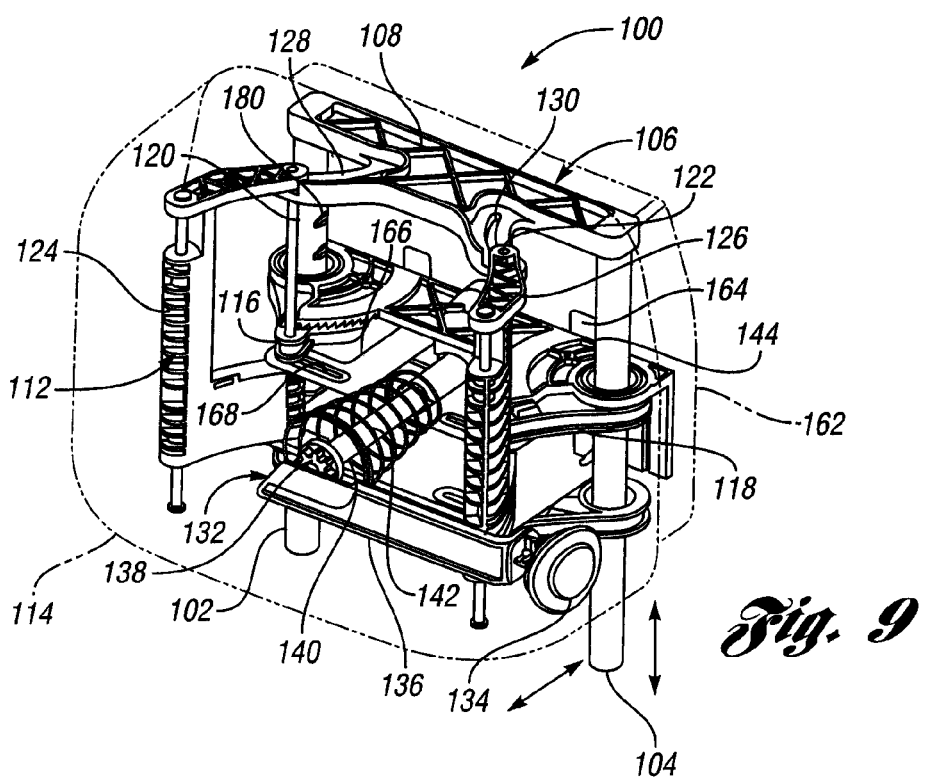
FIG. 9 is a perspective view of the head restraint of FIG. 8, illustrated in a second position.
Figure 10:
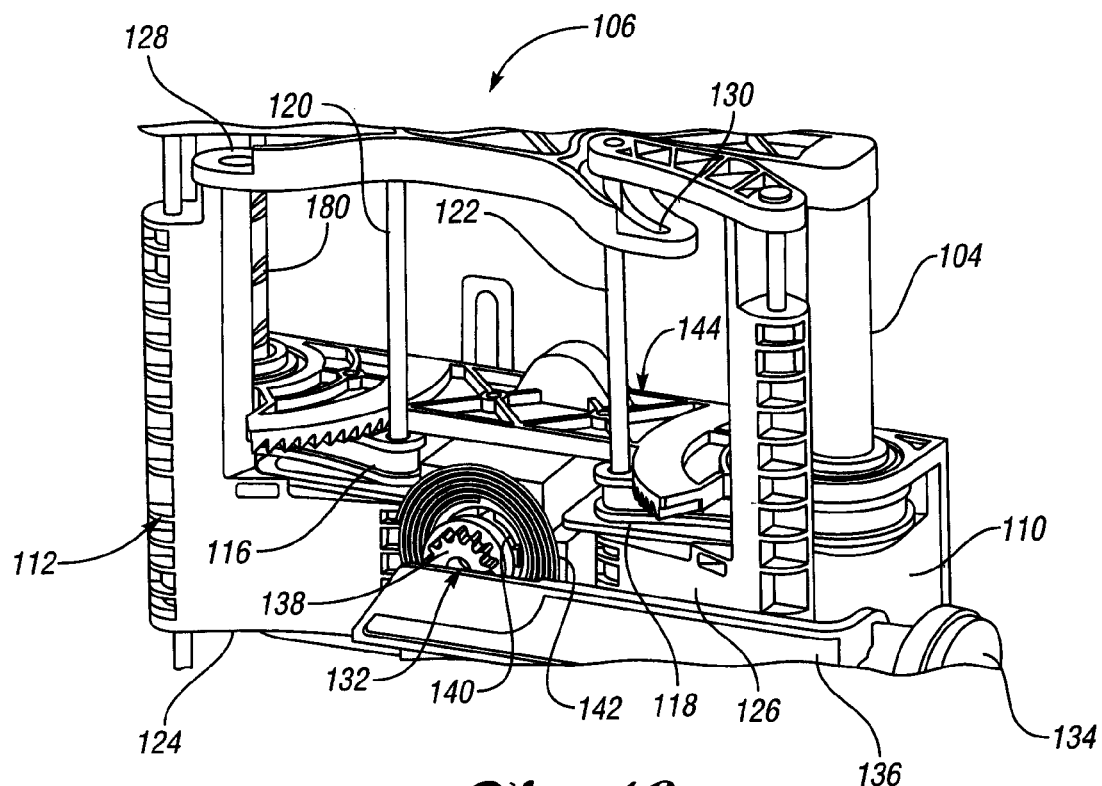
FIG. 10 is an enlarged perspective view of a locking mechanism of the head restraint of FIG. 8.
Figure 13:
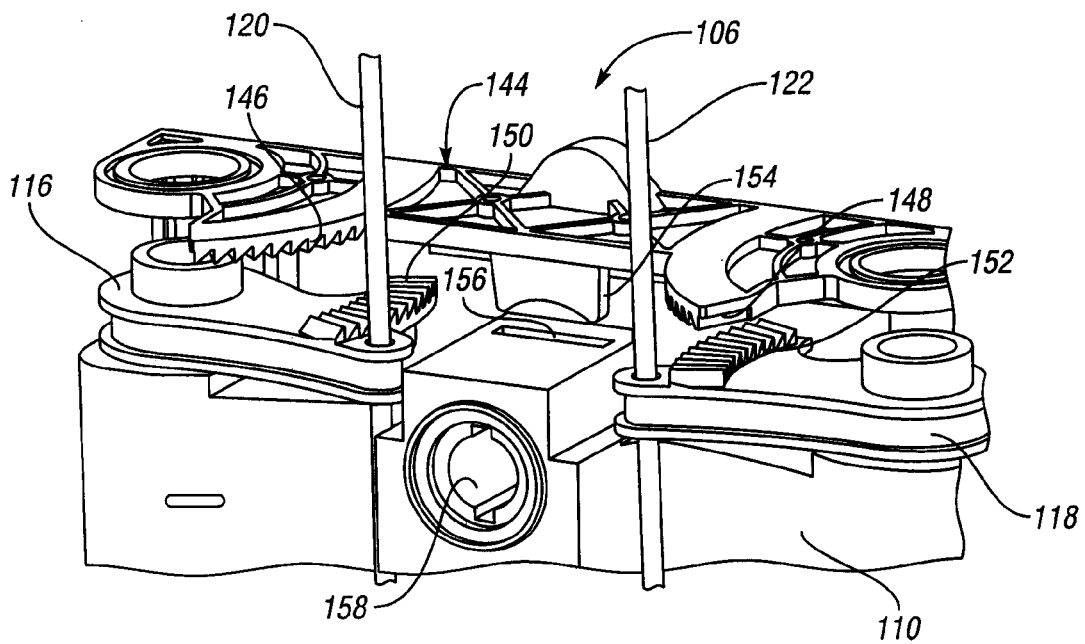
FIG. 13 is an enlarged fragmentary partially exploded perspective view of the locking mechanism of FIG. 8.
Figure 11:
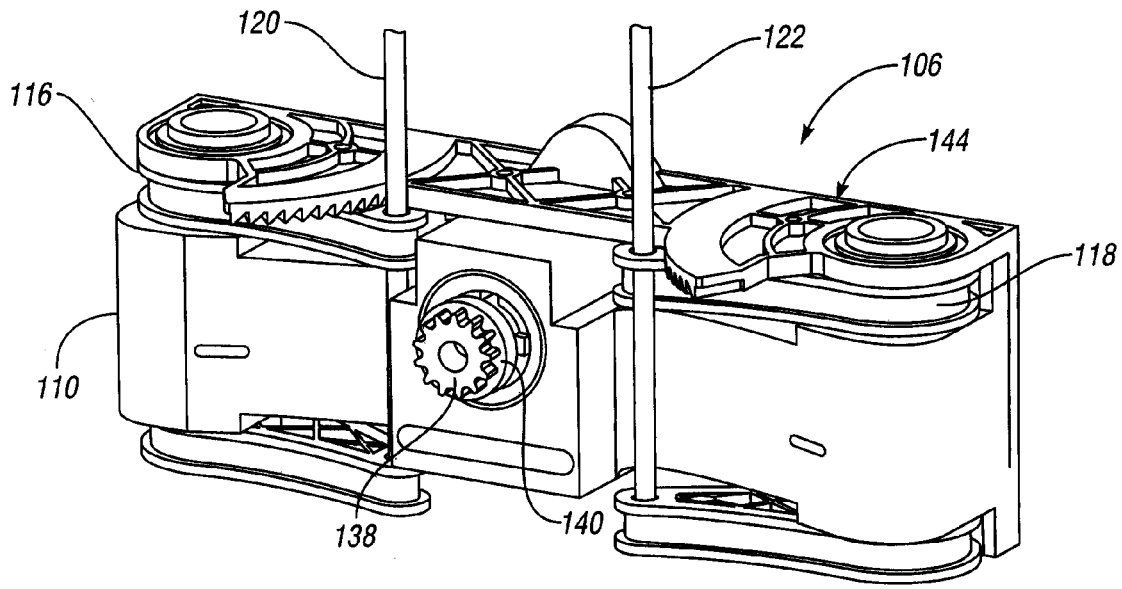
FIG. 11 is an enlarged fragmentary perspective view of the locking mechanism of FIG. 10.

The locking shaft 140 is rotatably connected to the forward shell 114 and extends into the frame 110. Referring now to FIG. 9, the forward shell 114 is illustrated at a forwardmost position, with the linkage 112 fully extended and the locking shaft 140 extending from the frame 110. A coil compression spring 142 is provided between the forward shell 114 and the frame 110 such that when the locking device 132 is actuated to the released position, the spring 142 urges the forward shell 114 to the forwardmost position. By releasing the locking device 132, the head restraint 100 is automatically translated to the forwardmost position to provide the head restraint 100 as close to the occupant as permitted to thereby enhance safety. Of course, the occupant can adjust the head restraint 100 to any rearward position, but the compression spring 142 provides automatic adjustment to the forward position so that the head restraint 100 is closer to the head of the occupant.

The compression spring 142 also assists in adjustment of the head restraint 100, whereby an occupant may press the release button 134 while reaching behind the head of the occupant. The compression spring 142 extends the forward shell 114 forward and the occupant may urge the forward shell 114 rearward by resting his or her head against the forward shell 114 until a desired adjustment position is obtained. Then, the occupant may release his or her finger from the release button 134 thereby returning the locking device 132 to the locked position and locking the head restraint 100 in the selected longitudinal position.

Referring now to FIGS. 10-14, the locking device 132 includes a ratchet plate 144 mounted to the frame 110 to translate linearly, in a direction parallel to the rods 102, 104, relative to the frame 110. The ratchet plate 144 includes a pair of radial arrays of ratchet teeth 146, 148 formed on an underside of the ratchet plate 144. Each top primary link 116, 118 includes a corresponding radial array of ratchet teeth 150, 152 in engagement with the ratchet teeth 146, 148 of the ratchet plate 144. Thus, when the ratchet plate 144 is engaged with the top primary links 116, 118, the engaged ratchet teeth 146, 148, 150, 152 lock the top primary links 116, 118 thereby locking the linkage 112 and fixing forward shell 114 relative to the frame 110.

The ratchet plate 144 has a follower 154 extending from its underside into a slot 156 in the frame 110. The slot 156 intersects a bore 158 through which the locking shaft 140 extends into the frame 110. The locking shaft 140 includes an eccentric member, such as a cam 160 that engages the follower 154. Rotation of the shaft 140 causes the cam 160 to raise the follower 154 thereby raising the ratchet plate 144 and disengaging the ratchet teeth 146, 148 of the plate 144 and the ratchet teeth 150, 152 of the primary links 116, 118.

Adjustment of the head restraint 100 in the fore and aft direction is provided by depression of the release button 134, which translates the actuation bar 136 inboard thereby rotating the locking shaft 140 clockwise. Rotation of the locking shaft 140 causes the cam 160 to raise the follower 154 and consequently the ratchet plate 144. Disengagement of the ratchet plate 144 from the top primary links 116, 118 permits longitudinal adjustment of the forward shell 114 to various positions between the fully retracted position of FIG. 8 and fully extended position of FIG. 9.

In another embodiment of the invention, the ratchet teeth 146, 148, 150, 152 of the ratchet plate 144 and the top primary links 116, 118 are all inclined in a rearward direction to resist retraction of the top primary links 116, 118 in a locked position, to thereby support the head of the occupant. This ratchet configuration, however, permits the user to extend the forward shell 114 forward without unlocking the locking device 132. This inclined ratchet configuration also omits the compression spring 142 to avoid inadvertent extension of the forward shell 114. Accordingly, the occupant may urge the forward shell 114 forward thereby extending the forward shell 114. However, in order to actuate the forward shell 114 rearward, the user must depress the release button 134 in order to release the locking device 132.

Similar to the prior embodiment, the head restraint 100 includes a rear shell 162 mounted to a bracket 164 on a yoke 166 that is mounted to the frame 110 to translate in the fore and aft direction. The yoke 166 includes slots 168 that receive the shafts 120, 122. Thus, as the linkage 112 expands from the collapsed position of FIG. 8 to the expanded position of FIG. 9, the yoke 166 translates the rear shell 162 forward from the position in FIG. 8 to the position in FIG. 9 to minimize an overall size of the head restraint 100 relative to an overall translation of the forward shell 114.

Figure 12:
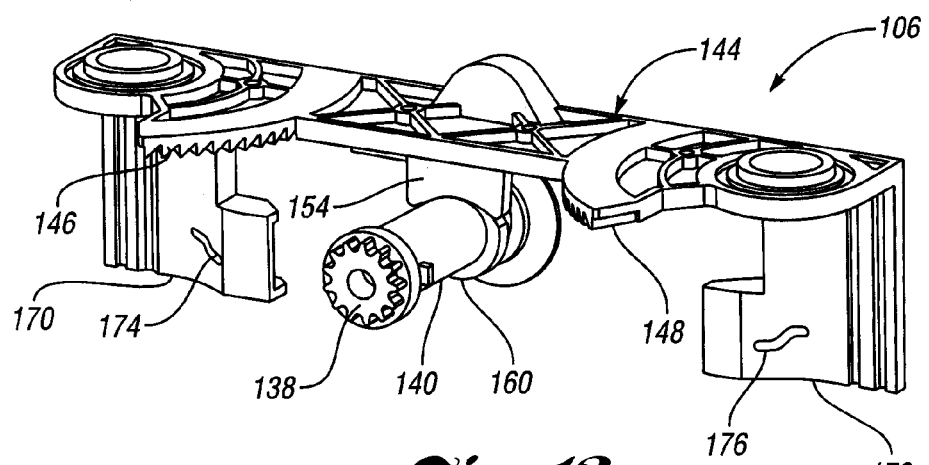
FIG. 12 is another enlarged fragmentary perspective view of the locking mechanism of FIG. 8.
Figure 14:
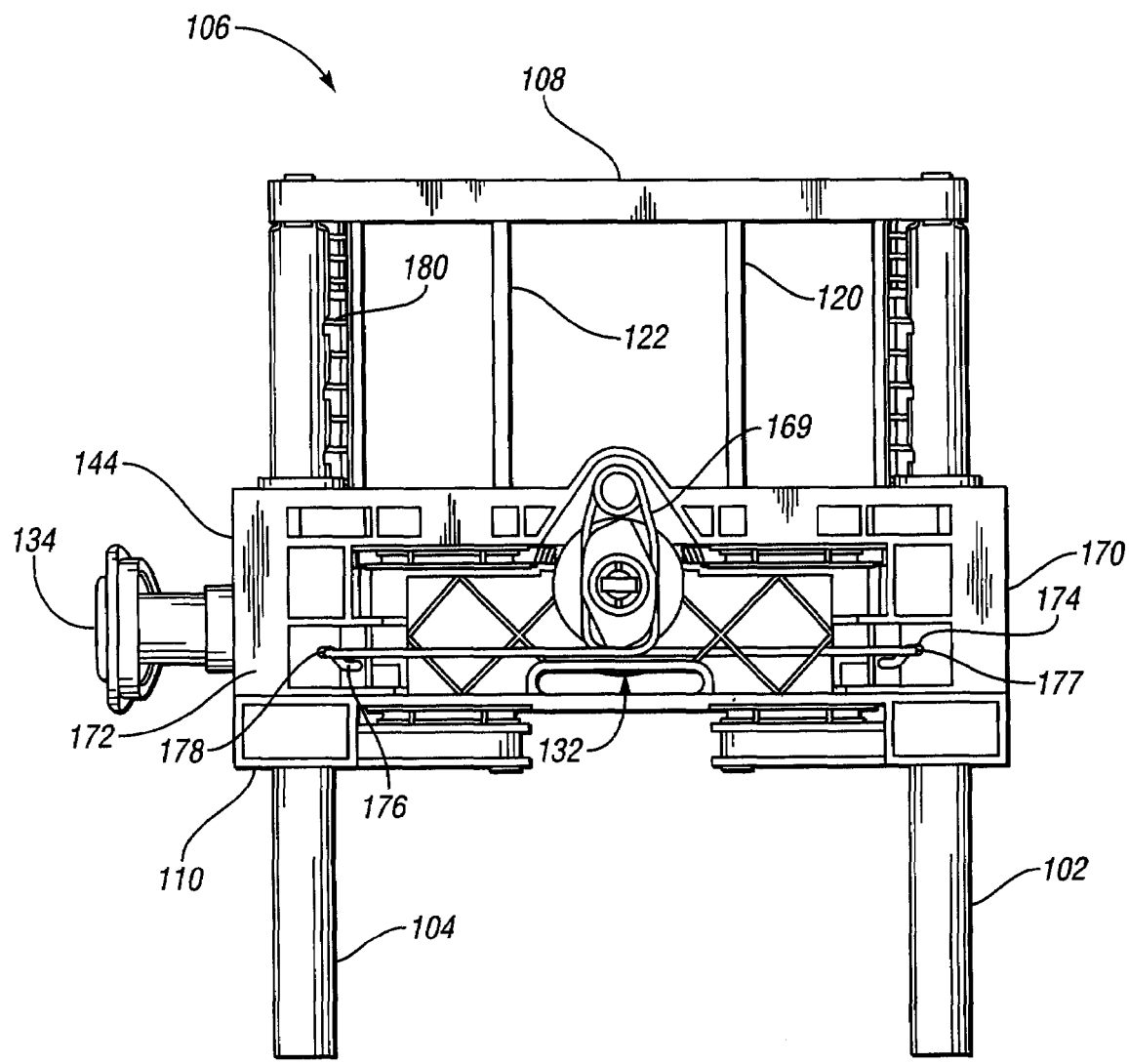
FIG. 14 is a rear elevation view of the locking mechanism of FIG. 8.

Similar to the prior embodiment, the head restraint 100 includes a wire spring 169 (FIG. 14) that is mounted on a rear side of the frame 110 for maintaining the ratchet plate 144 in engagement with the top primary links 116, 118. Referring now to FIG. 12, the ratchet plate 144 includes a pair of brackets 170, 172 extending downward from the ratchet plate 144. Each of the brackets 170, 172 includes a cam slot 174, 176 that is canted downward in an inboard direction of the respective cam slot 174, 176. The wire spring 169 includes a pair of spring ends 177, 178 that extend through the frame 110 and into one of the corresponding cam slots 174, 176. As the shaft 140 is rotated, the ratchet plate 144 is urged upwards by the cam 160 actuating the follower 154 of the ratchet plate 144. The rotation of the shaft 140 also drives an eccentric drive 179, thereby compressing the spring ends 177, 178. Upon release of a manual force from the release button 134, the wire spring 169 extends, thereby urging the spring ends 177, 178 outboard within the cam slots 174, 176 thereby urging the ratchet plate 144 downward and returning into engagement with the top primary levers 116, 118.

The rods 102, 104 include notches 180 for receiving the spring ends 177, 178 of the wire spring 169. As the locking shaft 140 is rotated to the released position, the ratchet plate 144 is lifted by the cam 160, and the eccentric drive 179 urges the spring ends 177, 178 inboard within the cam slots 174, 176 of the brackets 170, 172. By urging the spring ends 177, 178 inboard, spring ends 177, 178 become disengaged from the notches 180 within the rods 102, 104. Therefore, actuation of the release button 134 also permits height adjustment of the head restraint 100 relative to the associated seat back. Additionally, the cooperation of the spring ends 177, 178 within the cam slots 174, 176 helps to lift the ratchet plate 144 as the spring ends 177, 178 are retracted inboard by the eccentric drive 179.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat comprising:
   a seat back for supporting a back of an occupant;
   a rod mounted to and extending from the seat back, wherein the rod includes a series of notches formed therein;
   a frame mounted to the rod;

a linkage mounted to the rod to extend and retract relative to the frame in a forward and rearward direction;
a head restraint mounted to the linkage for supporting a head of an occupant and for extending and retracting relative to the frame;
a first locking mechanism cooperating with the head restraint and the frame for permitting incremental locking positions of the head restraint relative to the frame;
a manual release for releasing the first locking mechanism to extend and retract the head restraint relative to the rod; and
a second locking mechanism cooperating with the notches for maintaining a height position of the head restraint, and wherein the manual release releases the second locking mechanism for permitting height adjustment of the head restraint.

2. The vehicle seat of claim 1 wherein the first locking mechanism further comprises a first ratchet provided on the linkage and a second ratchet engageable with the first ratchet, and the second ratchet is mounted for translation relative to the frame and actuated by the manual release to a released position whereby the first and second ratchets are disengaged.

3. The vehicle seat of claim 2 wherein the first locking mechanism further comprises a shaft with an eccentric drive cooperating with the second ratchet such that the manual release rotates the shaft and translates the second ratchet out of engagement with the first ratchet.

4. The vehicle seat of claim 1 wherein the first locking mechanism further comprises a shaft, wherein one of the shaft, the frame and the linkage includes a longitudinal series of notches, and wherein another of the shaft, the frame and the linkage includes at least one projection that engages one of the series of notches in a locked rotary position of the shaft and the at least one projection is disengaged from the series of notches in a released rotary position of the shaft for extending and retracting the head restraint relative to the rod.

5. The vehicle seat of claim 4 wherein shaft includes a pinion gear and wherein the manual release further comprises a gear rack in engagement with the pinion gear for rotating the shaft between the locked and released positions.

6. The vehicle seat of claim 4 wherein the shaft includes a longitudinal series of alternating notches and projections and the frame includes a second longitudinal series of alternating notches and projections to engage the notches and projections of the shaft in the locked position of the shaft.

7. The vehicle seat of claim 4 further comprising a biasing member for maintaining the shaft in the locked position.

8. The vehicle seat of claim 7 wherein the biasing member engages the shaft thereby maintaining the shaft and the actuator in the locked position.

9. The vehicle seat of claim 4 wherein the shaft is pivotally connected to the head restraint.

10. The vehicle seat of claim 1 wherein the linkage further comprises a first link pivotally connected to the rod and a second link pivotally connected to the first link and the head restraint.

11. The vehicle seat of claim 10 further comprising a guide extending from the rod and connected to the pivotal connection of the first link and the second link to guide a path of the second link.

12. The vehicle seat of claim 10 wherein the head restraint further comprises a forward head restraint shell, and wherein the vehicle seat further comprises:
a yoke connected to the pivotal connection of the first link and the second link; and
a rear head restraint shell mounted to the yoke such that as the linkage expands, the yoke and rear head restraint shell translate forward relative to the rod, and the rear head restraint shell cooperates with the forward head restraint shell such that the forward head restraint shell expands relative to the rear head restraint shell in the extended position.

13. The vehicle seat of claim 12 further comprising a biasing member cooperating with the forward and rear head restraint shells for expanding the shells in the released position of the locking mechanism.

14. A vehicle seat comprising:
a seat back for supporting a back of an occupant;
a rod mounted to and extending from the seat back, the rod having a series of notches formed therein;
a frame mounted to the rod to slide along the rod;
a head restraint mounted to the frame for supporting a head of an occupant;
an eccentric mechanism pivotally connected to the frame;
a wire spring mounted to the frame for engaging one of the notches of the rod, the wire spring cooperating with the eccentric mechanism such that rotation of the eccentric mechanism to a released position retracts the wire spring from the notch; and
an actuator for rotating the eccentric mechanism from a locked position to the released position to slide the head restraint and frame along the rod;
wherein the rod further comprises a pair of rods, each having a series of notches formed therein and the wire spring engages a notch of each of the pair of rods; and
wherein the series of notches are formed on inboard sides of the rods and wherein the wire spring is coiled about the eccentric mechanism such that rotation of the eccentric mechanism expands the coiled portion of the wire spring thereby retracting the wire spring from the notches of the rods.

15. The vehicle seat of claim 14 wherein the frame has a pair of slots formed adjacent to the rods to retain the wire spring on the frame and to permit the wire spring to translate relative to the rods.

16. A vehicle seat comprising:
a seat back for supporting a back of an occupant;
a rod mounted to and extending from the seat back, the rod having a series of notches formed therein;
a frame mounted to the rod to slide along the rod;
an extendable mechanism mounted to the frame for extending and retracting;
a head restraint mounted to the extendable mechanism for supporting a head of an occupant and for extending and retracting relative to the frame in a forward and rearward direction;
a first locking mechanism cooperating with the head restraint and the frame for permitting incremental locking positions of the head restraint in the forward and rearward direction relative to the frame;
a second locking mechanism cooperating with the notches and the frame for maintaining a height position of the head restraint relative to the rod; and
a manual release for releasing the first locking mechanism to extend and retract the head restraint relative to the rod and for releasing the second locking mechanism for permitting height adjustment of the head restraint.

17. The vehicle seat of claim 16 wherein the second locking mechanism further comprises:
an eccentric mechanism pivotally connected to the frame; and
a wire spring mounted to the frame for engaging one of the notches of the rod, the wire spring cooperating with the eccentric mechanism such that rotation of the eccentric mechanism to a released position retracts the wire spring from the notch, wherein the manual release rotates the eccentric mechanism from a locked position to the released position to slide the head restraint and frame along the rod.

18. A vehicle seat comprising:

a seat back for supporting a back of an occupant;

a rod mounted to and extending from the seat back;

a frame mounted to the rod;

a linkage mounted to the rod to extend and retract relative to the frame in a forward and rearward direction, wherein the linkage further comprises a first link pivotally connected to the rod and a second link pivotally connected to the first link and the head restraint;

a head restraint mounted to the linkage for supporting a head of an occupant and for extending and retracting relative to the frame;

a locking mechanism cooperating with the head restraint and the frame for permitting incremental locking positions of the head restraint relative to the frame;

a manual release for releasing the locking mechanism to extend and retract the head restraint relative to the rod; and a guide extending from the rod and connected to the pivotal connection of the first link and the second link to guide a path of the second link.

19. A vehicle seat comprising:

a seat back for supporting a back of an occupant;

a rod mounted to and extending from the seat back;

a frame mounted to the rod;

a linkage mounted to the rod to extend and retract relative to the frame in a forward and rearward direction, wherein the linkage further comprises a first link pivotally connected to the rod and a second link pivotally connected to the first link and the head restraint;

a head restraint mounted to the linkage for supporting a head of an occupant and for extending and retracting relative to the frame, wherein the head restraint further comprises a forward head restraint shell;

a locking mechanism cooperating with the head restraint and the frame for permitting incremental locking positions of the head restraint relative to the frame;

a manual release for releasing the locking mechanism to extend and retract the head restraint relative to the rod;

a yoke connected to the pivotal connection of the first link and the second link; and a rear head restraint shell mounted to the yoke such that as the linkage expands, the yoke and rear head restraint shell translate forward relative to the rod, and the rear head restraint shell cooperates with the forward head restraint shell such that the forward head restraint shell expands relative to the rear head restraint shell in the extended position.

* * * * *